United States Patent [19]

Breidenstein et al.

[11] 4,314,110
[45] Feb. 2, 1982

[54] SYSTEM FOR THE TESTING OF TELEPHONE SWITCHING SYSTEMS

[75] Inventors: Charles J. Breidenstein; Charles A. Barbe, III, both of Rochester, N.Y.

[73] Assignee: Redcom Laboratories, Inc., Rochester, N.Y.

[21] Appl. No.: 177,659

[22] Filed: Aug. 13, 1980

[51] Int. Cl.³ .............................................. H04M 3/24
[52] U.S. Cl. .......................................... 179/175.2 R
[58] Field of Search ................ 179/175.2 R, 175.2 D, 179/175.2 C, 175.3 R, 18 ES; 364/200

[56] References Cited

U.S. PATENT DOCUMENTS 3,692,961  9/1972  Le Strat et al. ............... 179/175.2 R
3,952,172  4/1976  Penn et al. .................... 179/175.2 R
4,021,624  5/1977  Kelly et al. ................... 179/175.2 D
4,076,970  2/1978  Lubarsky, Jr. et al. ....... 179/175.2 R Primary Examiner—Thomas A. Robinson Attorney, Agent, or Firm—Martin LuKacher

[57] ABSTRACT

A system for generating calls in order to test telephone switching systems by simulating traffic loads has line interface circuits which send calls independently and in selected sequence on any number of a group of lines into the telephone switching system under test. Lines of the telephone switching system which are supposed to be called are terminated by the interface and outputs representing the successful completion or failure to complete calls are obtained. Commands for controlling the generation and termination of calls are generated under microprocessor control. DTMF originating and dial tone detecting circuits as well as circuits for transmission and loop polarity testing may be added to the line interface and controlled by the same microprocessor. The system has a microprocessor controlled display and keyboard terminal by means of which instructions for and reports of the results of the tests are obtainable.

16 Claims, 7 Drawing Figures

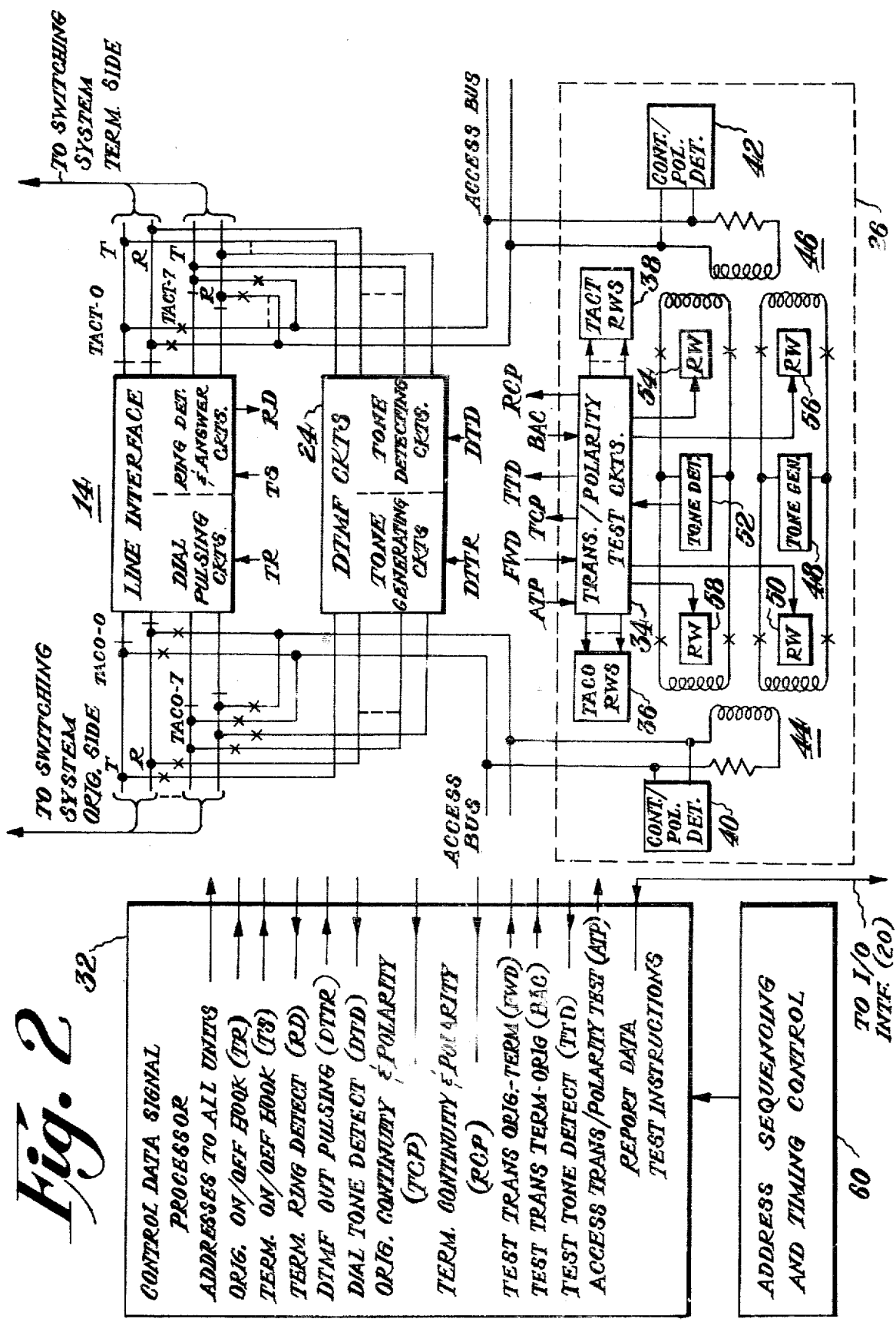

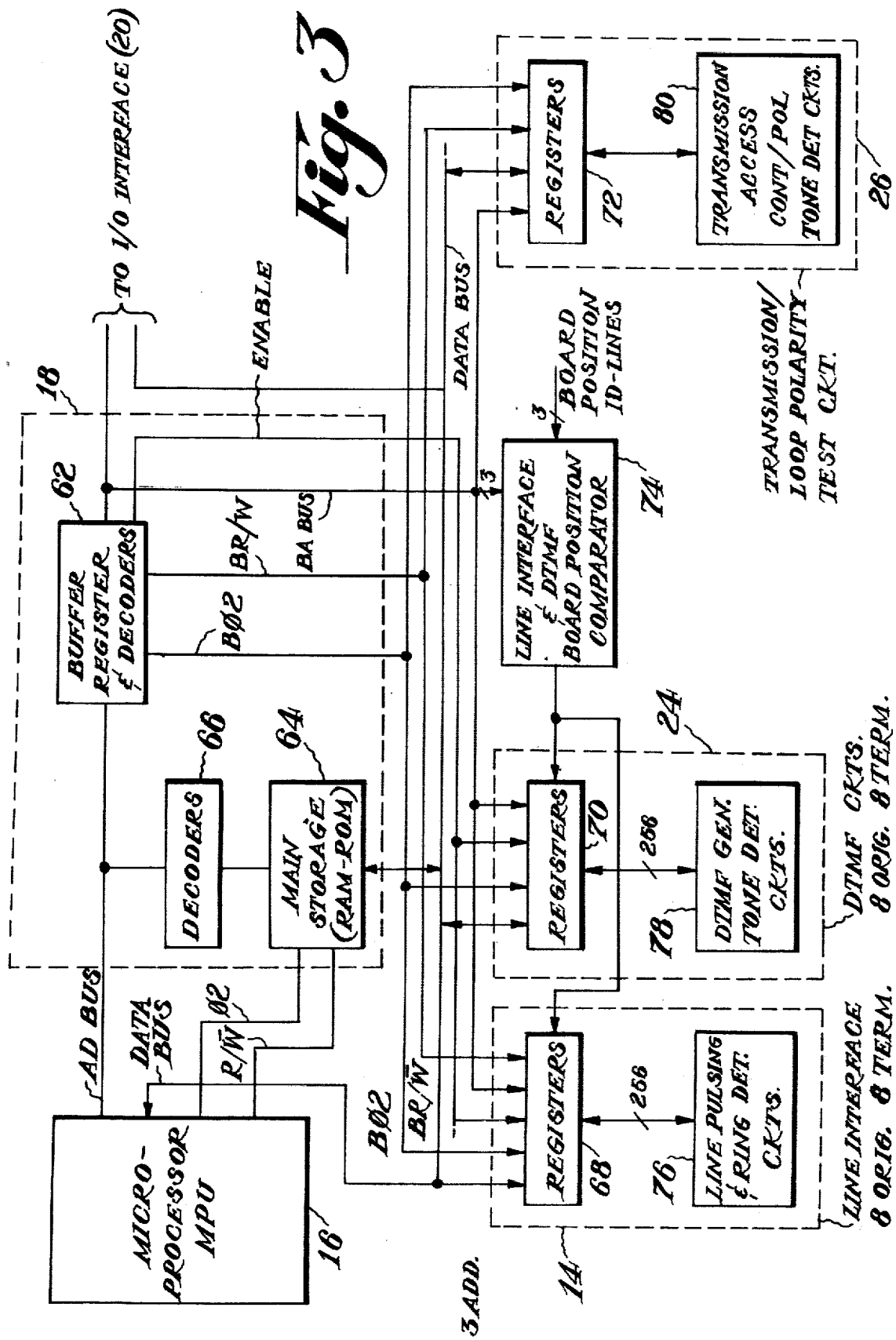

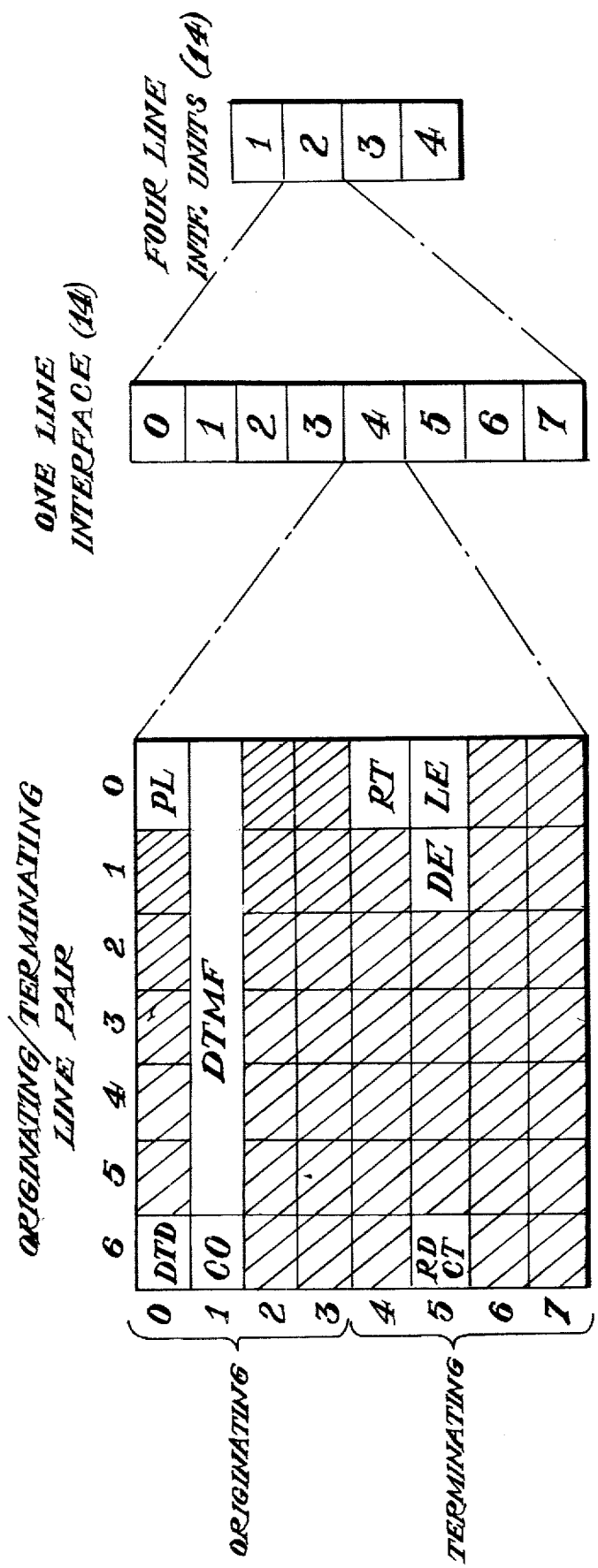

SYSTEM FOR THE TESTING OF TELEPHONE SWITCHING SYSTEMS

DESCRIPTION

The present invention relates to systems for evaluating the performance of telephone switching systems by simulating traffic loads thereon, and particularly to a system which generates independent telephone call originations and responds to terminations selectively on a large number of lines or ports of a telephone switching system all under microprocessor control such that various call scenarios, including wait periods, random calling, simultaneous calling, and dialled digit combinations, may be obtained in order to closely approximate actual telephone traffic loads.

The present invention is especially suitable for use in providing a call generator or load box for generating multiplicities of calls so as to test telephone switching systems of all types such as PABX, CO line circuits or loop signalling trunks with and without concentrators and call distributors. The invention may also provide for the termination of calls from a telephone switching system so as to test switching system performance.

The approximation of actual traffic loads and the evaluation of performance of telephone switching systems is a prerequisite to the successful development of such switching systems as well as to the successful cutover of a telephone switching system into the network or as part of an internal switching system, for an example as a PABX. It is necessary to test several lines and to terminate the called lines which are dialed by the originating or terminating lines. The approximation of various call scenarios in a testing system of reasonable physical size, which is capable of a large number of calls (e.g., 32 calls), has not been available. Capability for automatically generating a failure report useful in evaluating the performance of the switching system is also necessary for many applications. Testing systems which have heretofore been available have been of extremely large physical size or had limited testing capability such that close approximation of actual traffic loads and the ability to report on successful or unsuccessful completions of placed calls has not been fully realized.

It is a feature of this invention to provide a system which is capable of testing telephone switching systems without requiring the use of another switching system of comparable complexity and size to the system under test in order to obtain information as to performance under conditions approximating actual traffic loads.

It is therefore an object of the present invention to provide an improved system for testing telephone switching systems which is capable of generating call originations and accepting call terminations to approximate actual traffic loads on a telephone switching system.

It is a further object of the present invention to provide an improved system for testing telephone switching systems which is capable of measuring successful call completions, completion failures, including terminations to lines other than proper called lines (wrong numbers) so as to aid in the evaluation of the performance of the telephone switching system.

It is a still further object of the present invention to provide an improved system for the testing of telephone switching systems which is capable of placing a large number of call originations (for example up to 32) and accepting a large number of call terminations (for example up to 32) whether simultaneously or in other sequences including at random.

It is a further object of the present invention to provide an improved system for the testing of telephone switching systems which is operated under microprocessor control so as to facilitate modification of routing of calls, and waiting times, such as dialled digit durations, off-hook delay, ring hold, call hold, and other timing which occurs in the actual operation of the telphone switching systems which may be tested.

It is a still further object of the present invention to provide an improved system for the testing of telephone switching systems where all ports of the testing system are independent so as to originate and accept calls in any sequence from synchronous calling to random calling so as to exercise the telephone switching system under test in its worst case operation.

It is a still further object of the present invention to provide an improved system for the testing of telephone switching systems which is capable of DTMF signalling and tone generation for generating calls and also is capable of detecting dial tone.

It is a still further object of the present invention to provide an improved system for the testing of telephone switching systems which is capable of testing transmission through the switching system between originating and terminating lines or ports thereof unidirectionally or bidirectionally.

It is a still further object of the present invention to provide an improved system for telephone switching system testing which is capable of detecting failures in continuity through the switching system as well as loop polarity at the tip and ring connections of the originating and terminating lines through which connections are made via the switching system.

Briefly described, a system for generating calls in order to test a telephone switching system by simulating traffic loads thereon in accordance with the invention makes use of means for originating a plurality of calls independently and in selected sequences from synchronous or simultaneous calls to random sequences of calls. The system may include means for terminating the calls. Both the originating and terminating means may be provided in a line interface to which lines or ports of the telephone switching system under test are connected. Microprocessor control means generates commands for the line interface. These commands may be stored in a register of the line interface in which outputs representing the status of the lines under test may also be stored. Display means such as a terminal, is operated under the control of the microprocessor for indicating on which of the lines the calls are to be originated and accepted as well as the successful or unsuccessful completion of the calls. Under microprocessor control, the timing of dialled digits, wait periods for acceptance of calls, such as off-hook delay, ring hold and call hold, may also be indicated.

The foregoing objects, features and advantages of the invention, as well as the presently preferred embodiment thereof, will become more apparent from a reading of the following description in connection with the accompanying drawings in which:

FIG. 2 is a functional block diagram illustrating the operation of the testing system shown in FIG. 1;

FIG. 3 is a block diagram illustrating the architecture of the testing system shown in FIG. 1 in greater detail;

FIG. 4 is an illustration of the memory map of the registers of the testing system, as shown in FIG. 3;

Figure 5A:
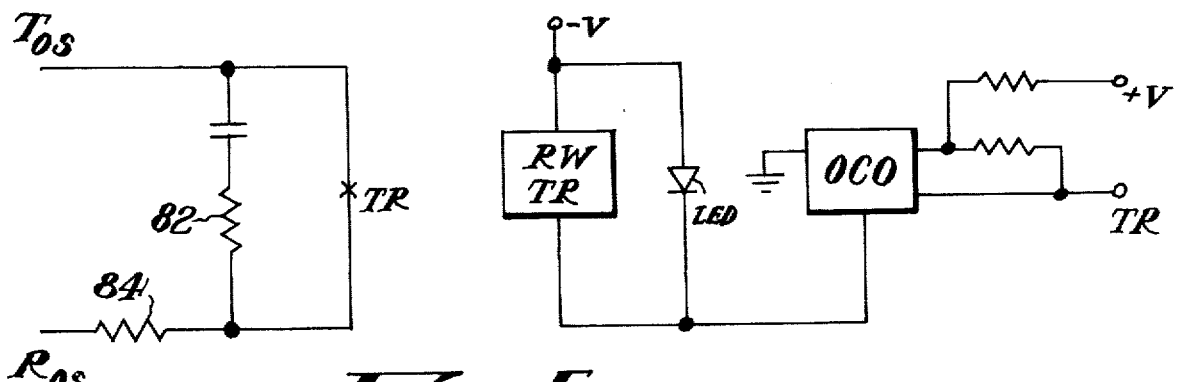

FIGS. 5A, B, and C are circuit diagrams of the dialing (out-pulsing) and ring detection circuits used in the system illustrated in FIGS. 1 through 4.

Figure 1:
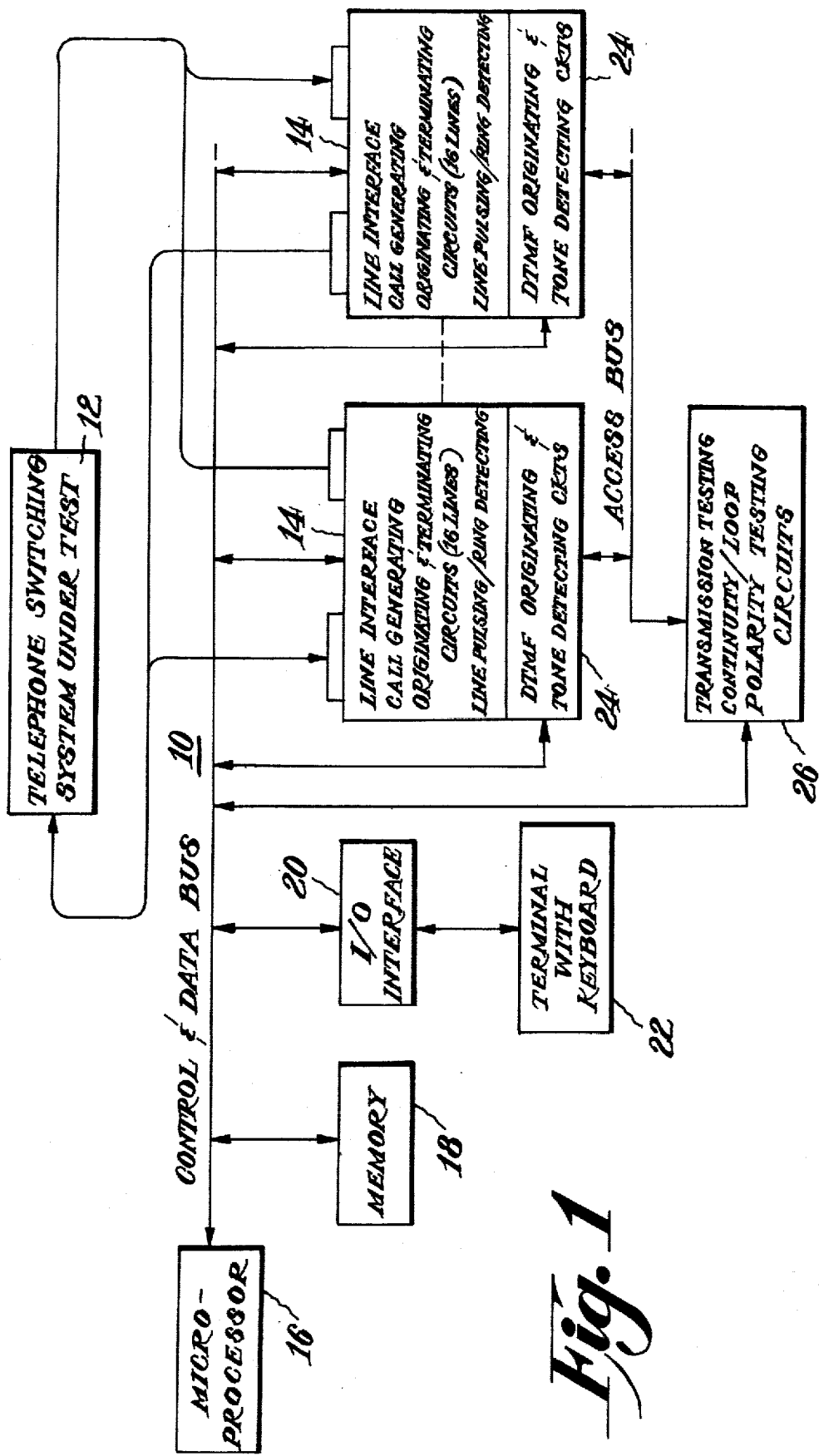
FIG. 1 is a block diagram of a system which embodies the invention for testing a telephone switching system.

Referring first to FIG. 1, the testing system 10 is connected to the telephone switching system 12 under test. This telephone switching system 12 may be of any type. It may include distributors and concentrators. It may be a PABX. It may be a TDM or cross-bar system. An example of the switching system which may be tested is found in U.S. patent application Ser. No. 42,742 filed May 29, 1979 in the name of Klaus Gueldenpfennig and Charles J. Breidenstein and entitled "Time Division Digital Communication Systems" now U.S. Pat. No. 4,288,536, issued Oct. 14, 1980.

Calls are generated and terminated by a plurality of call generating circuit units 14. These may be also referred to as line interface units in that they are connected to lines or ports of the switching system 12 under test. Each of these units 14 is, in this example, capable of handling 16 lines or ports. The illustrated system may have up to 4 such units 14, in which case 64 lines or ports may be handled. There may be 64 originate only lines which are provided in increments of 16 by each unit 14 or 32 originating/terminating pairs of lines in increments of 8 pairs. The originating lines are the calling lines into the originating side of the system 12 under test and the terminating lines are the called lines from the terminating side of the system under test.

Each call generating unit 14 is identical, and each has access to a microprocessor control unit 16 by way of a control and data bus. Commands from the microprocessor 16 are directed to the circuits of each unit 14, and outputs representing the successful or unsuccessful completion of calls from the circuits of the units 14 are transmitted over the bus to the microprocessor. The microprocessor has associated therewith a memory unit 18. Also connected to the control and data bus by way of an input/output interface 20, is a display unit such as a terminal 22 with a keyboard. The terminal 22 may, for an example, be a teleprinter. The interface 20 is addressed by the microprocessor 16 and instructions forwarded to the microprocessor 16 as to the calling and called lines which are to be originated and terminated by the line interface units 14 (i.e., routing). The microprocessor commands the line interface units 14 to dial out and accept calls on selected lines of the switching system 12 according to these instructions.

Outputs representing the successful or unsuccessful completion of the calls are transferred through the interface 20 to the terminal 22. Timing that is in effect in the system may be inputted to the microprocessor 16 and read out by means of the terminal 22 and interface 20. Such timing may be ring hold, call hold, time between calls, dialing duration (including dial make and break for line pulsing dialing) and inter-digit dial time. The commands sent to the line interface units 14 are timed to occur and are of duration as established by the timing instructions. The calling lines, on which calls are originated from the call generating units 14, as well as the called lines on which calls are terminated may be represented by a three digit code. The first digit, from zero to three, represents which call generating unit is used. The second digit, from zero to eight represents which of the 8 pairs of originating/terminating lines is used. The last digit, zero or one, represents whether the line is used as an originating, calling line or a terminating, called line.

The call generating circuits provide line pulsing and ring detecting. Optionally associated with the call generating circuit of each unit 14 are DTMF originating and tone detecting circuits 24. These circuits are identical and may be mounted as appliques on separate boards each associated with the board on which the line interfaces 14 for the same unit handling the same set of lines of the switching system 12 are disposed. The system may or may not be equipped with the DTMF originating and tone detecting circuits 24 depending upon the testing features which are desired. A transmission testing circuit 26, which may include loop polarity and continuity testing circuits, is also optionally provided in the system. These circuits 26 test the performance of the switching system 12 in transmitting signal tone between calling and called lines which are hooked up by the units 14. Transmission testing may be accomplished bi-directionally, that is from the calling to called line and from the called to calling line, so as to fully test duplex operation as permitted by four-wire switches, such as the digital switches used in some digital telephone switching systems which may be tested. The transmission and loop polarity testing circuits 26 as well as the DTMF originating and tone detecting circuits 24 receive commands and provide outputs representing successful or unsuccessful tests via the control and data bus to the microprocessor 16 and to the terminal 22 via the interface 20.

The transmission and loop polarity and continuity testing circuits 26 are selectively connected to the calling and called lines via an access bus. One of these circuits 26 therefore serves all of the units 14 and all 32 pairs of originated and terminated lines connected to the units 14.

The functional block diagram of FIG. 2 shows one of the line interface units 14 and indicates the dial pulsing and ring detecting and answering circuits thereof. The originating side of the switching system under test 12 is connected to the dial pulsing circuits of the interface 14. Each of the eight calling lines is a loop with tip (T) and ring (R) connections to the line interface. Only the first and last of the eight tip and ring connection pairs are shown. Similarly, the called lines are connected through their tip and ring connection pairs to the ring detecting and answering circuits of the line interface 14. The line interface also contains registers in which control data signals are stored. These control data signals are commands produced by the microprocessor or outputs which are received by the microprocessor. The microprocessor 16 functions as a control data signal processor 32 as indicated in FIG. 2.

The DTMF circuits 24 consist of tone generating circuits for each of the eight calling lines and these are connected to the tip and ring connections thereof. The tone detecting circuits may be connected to the calling line in order to detect the presence of dial tone which is generated in the switching system under test 12. Optionally the tone detecting circuits may be connected also to the called line. The system then may be used solely as a call generator to originate calls on all 64 possible lines or ports, in which case the absence or presence of dial tone when the line goes off hook is detected to indicate a possible failure mode. The DTMF circuits 24 also include registers for receiving commands and for outputs obtained as the results of tests.

The transmission testing and continuity and polarity testing circuits 26 include interface circuits 34 having registers which are connected to the control and data bus and therefore with the control data signal processor 32 and through it to the I/O interface 20 and terminal 22. The access bus is connected to the tip and ring connections of each called and calling line at the originating and terminating side of the switching system under test (up to 64 lines). Each line is connected to the access bus and to the testing circuits 26 by relay contacts indicated at TACO-0 to TACO-7 on the originating side and TACT-0 through TACT-7 on the terminating side. The normally open contacts of the relays illustrated in the drawing is shown by an "x" while the normally closed contacts are shown by a vertical bar. Operating windings for the TACO contacts, TACO RW 36 and TACT RW 38, are operated by the interface 34 of the transmission and polarity testing circuits 26, after called and calling lines are connected. This is accomplished successively by the control data signal processor 32.

After a call is completed between a selected called and calling lines by the line interface 14, the TACO and the TACT relays associated with that line are operated. The line interface is then disconnected while the called and calling lines are connected to the circuits 26. Then the continuity and polarity detectors 40 and 42, which may for example be bridge circuits, respond to the presence or absence of continuity on the loops through the switching system 12 on both the originating and terminating sides of the switch, as well as to the polarity of the tip and ring voltages. The use of continuity and/or polarity detectors is optional and may be provided in the testing circuits 26 whenever the continuity and/or polarity detecting feature is desired.

A coupler 44 such as a transformer is connected to the particular originating or calling line under test. Another coupler 46 is connected to the called or terminating line under test. A tone generator 48 outputs a tone signal in the forward direction when a relay 50 is operated by the interface 34. A tone detector 52 is connected through the contacts of another relay 54 to the called line via the coupler 46. The transmission of tone signals through the switch 12 under test is detected by the tone detector 52 and an output representing the presence or failure of the proper transmission level is outputted through the interface 34.

In order to check transmission in the backwards direction, another pair of relays 56 and 58 is alternatively actuated. After a pair of called and calling lines which handle the same call are tested, the transmission testing and loop polarity and continuity testing circuits 26 are switched, by operating other TACO and TACT relays, to another pair of lines between which a call has been completed. In this way all of the lines can be checked for transmission level and for continuity and loop polarity if desired.

The control data signal processor 32 is operated sequentially by an address sequencing and timing control 60. Addresses to all units, the interfaces 14, DTMF circuits 24, testing circuits 26 and I/O interface 20 are generated by the processor 32, so as to output commands in time sequence with the generation thereof in the processor 32. Outputs are also received from the interface 30, the DTMF circuits 24 and the interface 34 of the transmission testing circuits 26, in accordance with their addresses, during the course of system operation.

The microprocessor commands for the line interface units 14 are on/off hook commands (TR) for the dial pulsing circuits. These commands are forwarded over the control and data bus to different line interfaces and to different dial closing circuits thereof in accordance with address signals which are also transmitted over the bus. A particular circuit at a particular time then goes off hook upon transmission of its TR command. This command may be pulsed so as to come on and off repeatedly with predetermined timing in order to send dial pulses out on the calling line.

The ring detector and answering circuits of the called line are enabled to detect ringing if in fact an actual connection has been made through the switching system under the test. Then, there is an off hook command (TS) for each terminating line. This command conditions the terminating line which is called by the calling line and represented by the number which is dialed to go off hook. By pulsing the TS command, a number may be dialed on the terminating line such that some or all of the terminating lines may be used as calling lines in order to more fully exercise the switching system under test in a call generating mode.

The ring detect output (RD), which is stored as a bit in the interface registers 68, indicates that ringing has been detected on the terminating line and is transmitted by way of the control and data bus to the processor 16 when this bit is addressed by the processor 16.

The bit DE in the register 70 indicates that the system is equipped with a DTMF circuit. The LE bit in the register 68 indicates that the system is equipped with a line interface circuit. The LE, DE bits are used since the system may have one or more (up to 4) line interface and DTMF circuits 14 and 24. Also the system may or may not be equipped with a transmission test circuit 26. When the system is equipped with DTMF circuits 24, an output (DE) (not shown in FIG. 3. but shown in FIG. 4) is provided to the processor 32. The processor 32 also receives, for each line of a line interface unit 14 equipped with DTMF circuits 24, dial tone detect (DTD) outputs at the address times for each calling line. DTMF outpulsing commands (DTTR) which represent the dialed digits in multifrequency tone format are applied to the DTMF circuits for each calling line which is connected thereto. The DTTR commands are stored as multibit codes in registers in the DTMF circuits 24. Each calling and called line pair has its own dedicated group of locations in these registers. These registers also store the DTD outputs. The registers will be described in greater detail in connection with FIGS. 3 and 4.

The codes operate the individual tone generating circuits for each of the calling lines such that the multifrequency tones for each digit are transmitted sequentially on the lines. The called lines, whose numbers correspond to the digits, are terminated by the ring detecting and answering circuit in the line interface 14. When ringing is detected, the RD outputs are presented in the group of line interface register locations for the calling and called line pair. The line interface is operated by the TS commands to cause the called lines to go off hook.

The interface 34 of the transmission testing circuits 26 receives access transmission/polarity test commands (ATP). Inasmuch as there is only one transmission testing circuit 26 for all four line interface units 14, the transmission testing circuit 26 is allocated to each called and calling line on command using a cut-through bit. These bits are stored in the location for each called and calling line which is to be connected via the access bus to the tip and ring connections of the lines when transmission and continuity or polarity tests are to be made. The bits, (CO) cut-through originating, and (CT) cut-through terminating, control the TACO and TACT relays which disconnect the line interface unit and connect the line to the continuity/polarity detectors 40 and 42 and the couplers 44 and 46. CO controls the TACO relay and CT controls the TACT relays.

Testing for transmission in the forward direction or in the backward direction utilizes the FWD and BAC commands. The outputs from the continuity/polarity detectors 40 and 42, which are (TCP) and (RCP), respectively, are provided by the interface 34 to the processor 32. The transmission level output from the tone detector 52 is provided by the interface 34 as the (TTD) output thereof. The presence of a FWD command and a TTD output indicates the result of a transmission level test in the forward direction. A BAC command and a TTD output represents the results of a test of transmission level in the backward direction.

Referring next to FIGS. 3 there is shown the microprocessor 16 and its associated memory 18. Also shown in one of the line interface unit 14, of which 3 additional units may be provided. The system illustrated in FIG. 3 is equipped with one of the DTMF circuits or appliques 24. Three additional DTMF circuits may also be included in this exemplary system. One transmission and continuity and loop polarity testing circuit 26 is also provided in the system illustrated in FIG. 3.

The control and data bus between the memory 18 and the microprocessor 16 is provided by the address bus which may contain 16 address lines (AD-Bus) and an 8 line data bus. The control and data bus between the microprocessor unit 16 and the memory 18 includes the $\phi 2$ and the R/W commands. A $\phi 2$ appears when the data on the data bus is valid. The R/W is normally of a level to enable reading from a memory RAM. The address signals on the AD-Bus buffer registers and decoders 62 in the memory appear at the output of these decoders on the buffered address or BA-Bus. The BA-Bus and the data bus as well as the $\phi 2$ and R/W lines, constitute the control and data bus between the memory 18, the I/O interface 20 and the line interface 14, DTMF circuits 24 and transmission test circuit 26.

The microprocessor (MPU) 16 may be a commercial microprocessor chip such as the type 6803 which is manufactured by Motorola Semiconductor Company of Phoenix, Ariz. An asynchronous communications adapter may connect the control and data bus independently to the I/O interface 20 in order to provide the control and data signals serially to the interface 20 so as to permit the interface 20 to be a serial type interface.

The memory 18 consists of a main storage unit which may have several thousand addresses of read only memory as well as random access memory of about 2,000 addresses. If the memory or any other devices in the system are not being addressed, they remain tri-stated on the bus connected thereto; that is, in their high impedance state. In other words, if a chip such as a memory chip is not enabled, the chip will automatically tri-state. Therefore, the buses can serve several chips which provide registers and logic units of the system.

The main storage 64 receives its addresses through decoders 66 which select only those addresses on the address bus allocated to the main storage. Other addresses are allocated to registers 68, 70 and 72 in the line interface 14, DTMF circuits 24 and transmission test circuits 26. The decoders in the buffer registers and decoders 62 also obtain an enable output which prevents the registers 68, 70 and 72 from responding to addresses unless intended for the interface 14 or the circuits 24 and 26.

The assignment of different ones of the four possible line interfaces 14 and DTMF circuits 24 is made by the MPU through a board position comparator 74 which reads position identification (ID) lines (3 bits) from the back plane of the main frame in which the line interface and DTMF circuit printed wiring boards are received. The comparison between the bits from the ID line and bits from the addresses transmitted along the AD-Bus to the comparator 74 enable the addressing of each line interface 14.

The MPU scans the registers and has access to each register in the locations therein for each line of the switch under test. Because of the position identification lines, the system is flexible in that the boards for the line interfaces and DTMF circuits need not be located in unique main frame positions. The assignment of the line interfaces is made by the MPU upon initialization (power up).

The registers 68, 70 and 72 contain the commands for the operation of the circuits in their respective units. The registers also contain information sent by the circuits, that is, the outputs which are produced as a result of tests on the switching system under test. Registers 68 in a line interface 14 are connected through coupling circuits and buffers (not shown) to the line pulsing and ring detecting circuits 76 of the interface 14. Similarly, the DTMF generating and tone detecting circuits 78 and the DTMF circuits are connected to the registers 70 thereof. Transmission accessing circuits, which operate the TACO and TACT relays to connect the tone detector circuits and the tone generator circuits to lines under test, are also resident in the interface 14. The continuity/polarity, tone detecting circuits and these access circuits, and access circuits 80, are coupled to the registers 72. The registers 72 are part of the interface 34 of the transmission test circuit 26.

Referring to FIG. 4, there is shown a memory map of the registers 68, 70 and 72 which may be identical. A group of locations for one originating (calling) and terminating (called) pair of lines is show. The fan out shows that there are eight such pairs in each line interface 14, and for four line interfaces, a total of thirty two pairs of lines may be tested. There are like numbers of consecutive groups of locations. Not all are used, however, so that addressing and scanning of the registers is simplified. The registers themselves may be made up of flip-flop arrays. The arrays are 8 bits (1 data byte) wide and 32 bytes long. Consecutive locations which may be identified by the 16 address bits on the address bus are associated with the 8 originating or calling lines and the 8 terminating or called lines. For simplification, only the first 4 locations or addresses, 0-3, which are associated with the calling lines are shown. Only the first 4 addresses or consecutive locations 4-7, which are associated with the called lines, are also shown in FIG. 4. The location of the bits representing the other commands are indicated by the nomenclature for these commands discussed above. The Table in FIG. 4 further identifies the bits. The DTMF code consisting of 6 bits is located in the second byte of each calling line location. This code operates logic which controls the DTMF tone generator which transmits the dialled tones over the calling lines. The decoders for the DTMF code are part of the DTMF generators 78. Inasmuch as the registers 68, 70 and 72 are all identical and the locations therein are consecutive, consecutive addresses may be used to read commands into the registers and to write outputs therefrom by way of the data bus. These outputs are forwarded over the data bus to the I/O interface 20 and are translated into information which may be displayed as by providing a print out in the terminal 22 (FIG. 1).

Referring to FIG. 5 there are shown circuits for sending dial pulses on each of the calling lines. The tip and ring connection of the calling line, $T_{OS}$ and $R_{OS}$ are connected across relay contacts (TR). The contacts are bridged by a capacitor and resistor network 82 and connected to the ring terminal by a resistor 84, as is conventional. The operating winding of the TR relay, RWTR, is bridged by a "free wheeling" diode, for protection of the driving circuit. The operating winding receives operating current from an optical coupler (OCO). The coupler is enabled to deliver the operating current when the TR command is present, which occurs when the TR level is low.

Figure 5B:
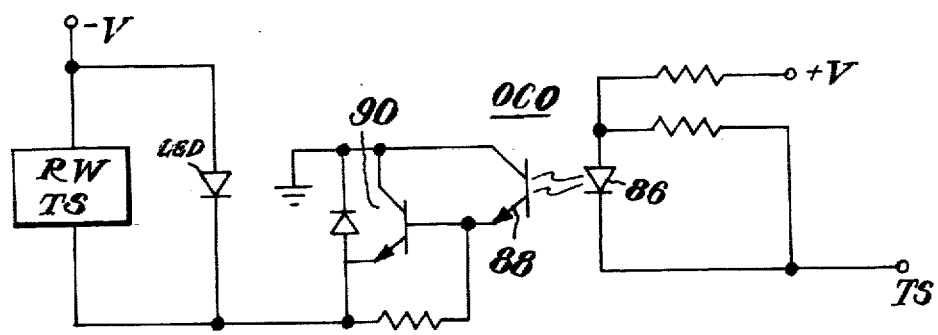

The OCO may be a circuit as shown in FIG. 5B, containing a light emitting diode 86, a phototransistor 88 and a current amplifier 90. The duration of the dial digits and the time between digits is controlled by the timing of the commands as transmitted by the MPU 16. A sequence of dial pulses is transmitted via the tip and ring connections to the calling lines.

Figure 5C:
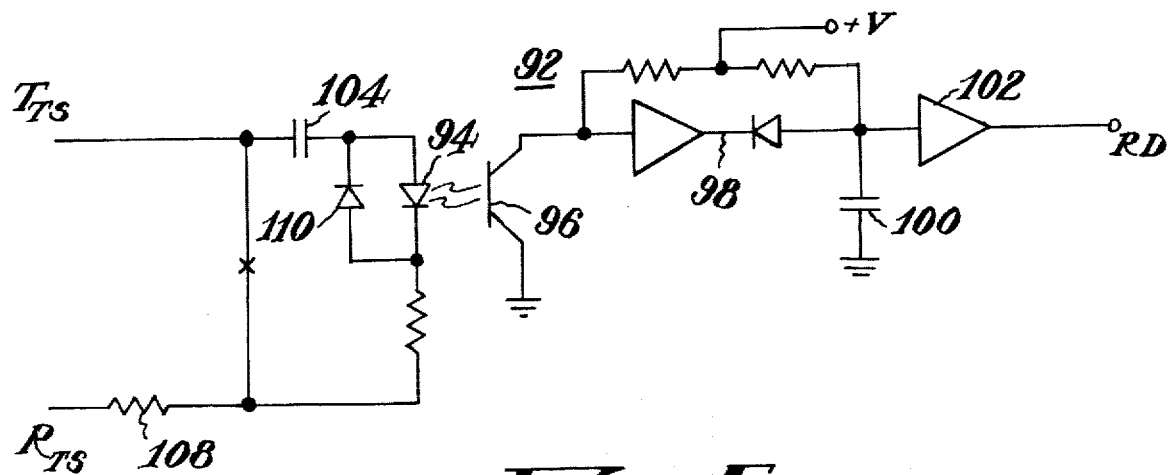

As noted above, the called or terminating line may also be used to originate calls. The tip and ring connections $T_{TS}$ and $R_{TS}$ are bridged by the contact of a TS relay. This relay is open in the absence of a TS command which also designates that the called line is on hook. Then the called line is connected to the ring detecting circuits 92 which are shown in FIG. 5C. By opening and closing the TS relay contacts, dial pulses may be transmitted out on the called line.

The circuit of FIG. 5B is the operating circuit for the TS relay. This circuit sends operating current to the relay operating winding RWTS. The TS command results in the generation of the operating current by illuminating the light transmitting diode 86 in the optical coupler OCO thereof. When the TS level is low, the called line is off hook. When the TS level is high, the called line is on hook, pulsing of the TS command causes the generation of dial pulses. When the calling line is off hook, an LED (not shown) associated with the RWTR relay (FIG. 5A) is illuminated by a contact on that relay. When the called line is off hook, an LED (not shown) associated with the RWTS relay is illuminated by a contact on that relay. Inasmuch as the tip and ring connection for each of these lines is available, a manual test for dial tone and even for tone transmission may be made by connecting a hand set to the tip and ring connections of selected lines. Such manual tone transmission checks are not required when the transmission test circuit 26 is implemented. The speed of operation of the test system is enhanced, since addresses for equipment which is not present may be skipped over during operation.

Referring again to FIG. 5C, an optical coupler OCO has a light emitting diode 94 which is illuminated by ringing current and produces light pulses. These pulses are detected by a phototransistor 96, amplified and half-wave rectified in a circuit 98 connected to the transistor 96, and integrated by an integrating circuit with a capacitor 100 and an amplifier 102. The light pulses picked up by the phototransistor 96 are translated into current pulses which are integrated and produce the RD output level when ringing is detected. A capacitor 104 couples the ringing current to the light emitting diode 94. The circuit, through the diode 94 and back to the ring connection $R_{TS}$, is completed by resistors 106 and 108. A diode 110 which bridges the light emitting diode 94 protects that diode from overvoltage in the reverse direction. The RD output is coupled to the register 68 and presented in the proper location allocated to the called line on which ringing is detected. The TS and TR commands are coupled to the line pulsing circuit and off hook circuit shown in FIG. 5A and FIG. 5B from the register 68. Similarly, the DTMF generators and tone detecting circuits 78 are coupled to the location (the flip-flops) in the registers 70 allocated thereto. The same is true for the circuits 80 and the registers 72 in the transmission test circuit 26.

From the foregoing description it will be apparent that there has been provided an improved system for testing of telephone switching systems. An exemplary and preferred embodiment of the testing system which is capable of testing up to 32 calling and called line pairs has been described. The use of microprocessor controls enables the system to be implemented in a unit of small size. The microprocessor control also contributes to the provision of other features of operation of the testing system. The system may, of course, be expanded. Other variations and modifications, within the scope of the invention, will undoubtedly suggest themselves to those skilled in the art. Accordingly, the foregoing description should be taken as illustrative and not in a limiting sense.

We claim:

1. A system for generating calls in order to test telephone switching systems by simulating traffic loads thereon which comprises from one to a given plurality of independent and identical means for originating a plurality of calls each independently and in selected sequence and number on command and applying said calls each to a different calling line of a group of lines of a telephone switching system which is under test, separate first register means for each of said originating means each having an array of memory groups which groups each have a plurality of locations in excess of the number necessary for said commands to enable access for said commands and for different input/output data associated with the testing of the lines of said telephone switching system under test, and microprocessor control means for generating said commands connected to said originating means and said register means thereof.

2. The invention as set forth in claim 1 further comprising separate tip and ring circuit means for said originating means for completing loops through each of said lines of said system under test, and means for sending selected sequences of called line numbers via said tip and ring circuit means upon said commands.

3. The invention as set forth in claim 1 further comprising independent and identical line interface means, equal in number to the number of said originating means in said system, and including said originating means and means for terminating different pluralities of called lines of said telephone switching system each independently and providing outputs representing ringing and failure to ring thereof which are presented at corresponding locations in the array of the first register means of each said line interface means, and means controlled by said microprocessor means for displaying said outputs to indicate the successful or unsuccessful completion of the originated calls.

4. The invention as set forth in claim 3 further comprising separate tip and ring circuit means in said originating means and in said terminating means for completing loops through said called and calling lines, respectively and means for sending selected sequences of called line numbers at least via said tip and ring circuit means in said originating means, and means for sensing ringing on each of said tip and ring circuit means in said terminating means to provide said outputs.

5. The invention as set forth in claim 4 wherein said microprocessor means includes means for transferring said commands therefrom to said first register means and for transferring said outputs to said displaying means.

6. The invention as set forth in either of claims 1 or 3 further comprising means for detecting the presence of dial tone on each of said calling or called lines, means for storing outputs representing the presence of dial tone on each of said lines in dedicated ones of said locations in said register means.

7. The invention as set forth in claim 1 further comprising DTMF tone generating means for each of said calling lines, DTMF register means equal in number to the number of said originating means in said system, each having an array of memory groups and locations corresponding to the array of each of said first register means, means for applying DTMF representing commands as to the numbers of called lines into said DTMF register means in separate groups of consecutive locations each for a different one of said calling lines and each group containing locations for dial tone representing outputs for its respective calling line different from the locations for DTMF representing commands therein, and means for operating said DTMF generating means for each calling line separately in response to different ones of said DTMF commands.

8. The invention as set forth in claim 3 further comprising DTMF originating and tone detecting circuit means equal in number to the number of said line interface means in said system, said DTMF circuit means being independent and identical, DTMF register means in each of said DTMF circuit means having an array of memory groups and locations corresponding to the array of said first register means, said microprocessor means being connected to said DTMF circuit means and said DTMF register means thereof for applying DTMF representing commands as to the number of called lines into said DTMF register means in separate groups of consecutive locations each for a different one of said calling lines, and said DTMF circuit means including means for applying dial tone on each of the calling lines associated therewith and for detecting the presence of dial tone on each of said calling or called lines associated therewith, said first register means and said DTMF register means having locations for said DTMF commands and dial tone outputs and for said line interface commands and outputs, said locations being different and non-overlapping in both said first register means and in said DTMF register means.

9. The invention as set forth in claim 1 wherein said system further comprises means for addressing a dedicated one of said locations in said arrays of each of said first register means with data indicating the absence or presence, for each said group of lines, of line interface means, including said originating means and means for terminating a plurality of called lines which generate calls on and terminate different lines of each of said groups of said lines.

10. The invention as set forth in claim 9 further comprising means for selectively connecting a plurality of separate DTMF originating and dial tone detecting means, each corresponding to a different one of said line interface means, to the groups of lines tested by different ones of said line interface means, and means for addressing another one of said locations in said first register means array for the line interface means, to which said DTMF originating and dial tone detecting means correspond, with data indicating the absence or presence thereof in said system.

11. The invention as set forth in claim 3 further comprising means for testing for the transmission of tones through said switching system under test comprising signal tone generating means and signal tone detecting means having separate transmission test register means associated therewith, said transmission test register means also having an array of memory groups and locations corresponding to said array of said first register means, means responsive to said microprocessor commands for connecting said tone generating means and said tone detecting means selectively to different ones of said calling and called lines on which said calls are originated and terminated by said originating and terminating means, respectively, and means included in said displaying means for indicating outputs from said tone detecting means as to the successful and unsuccessful transmission of said tone signals under control of said microprocessor means.

12. The invention as set forth in claim 11 wherein said means for connecting said tone signals generating means and said tone detecting means further includes means for applying said tone signals selectively to said called lines and said tone detecting means selectively to said calling lines whereby to test for transmission in both forward and backward directions through said switching system.

13. The invention as set forth in claim 12 whenever said transmission testing means further comprises means for detecting the loop continuity and polarity of ring and tip voltage on said calling lines on which calls are originated by said originating means and on said called lines to which calls are terminated by said terminating means.

14. A system for generating calls in order to test telephone switching systems by simulating traffic loads thereon which comprises a plurality of independent and identical line interface means including means for originating a plurality of calls independently and in selected sequence and number on command and applying said calls each to a different calling line of a different group of lines of a telephone switching system which is under test and means for terminating different groups of called lines of said telephone switching system each independently and providing outputs representing ringing and failure to ring thereof, microprocessor control means connected to each of said line interface means, and means controlled by said microprocessor means for displaying said outputs to indicate the successful or unsuccessful completion of the originated calls, and further comprising a plurality of separate DTMF originating and dial tone detecting means each corresponding to a different one of said line interface means, each DTMF originating and dial tone detecting means comprising a plurality of DTMF tone generating means and a plurality of dial tone detecting means each also for a different one of said calling lines, means for testing for the transmission of tones through said switching system under test comprising signal tone generating means, signal tone detecting means, means responsive to said microprocessor commands for connecting said tone generating means and said tone detecting means selectively to different ones of said calling and called lines to which calls are originated and from which calls are terminated by said originating and terminating means, respectively, and means included in said displaying means for indicating outputs from said tone detecting means as to the successful and unsuccessful transmission of said tone signals under control of said microprocessor means.

15. The invention as set forth in claim 14 wherein said means for connecting said tone signals generating means and said tone detecting means further includes means for applying said tone signals selectively to said called lines and said tone detecting means selectively to said calling lines whereby to test for transmission in both forward and backward directions through said switching system.

16. The invention as set forth in claim 15 wherein said line interface means further comprises line interface register means having groups of consecutive locations for commands and outputs, wherein said DTMF originating and dial tone detecting means also comprises DTMF and dial tone register means having groups of consecutive locations for commands and outputs corresponding to said groups of consecutive locations in said line interface register means, wherein said transmission testing means also comprise transmission register means having groups of consecutive locations for commands from said microprocessor means and outputs from said tone detecting means corresponding to said groups of consecutive location in said line interface register means, said locations for said line interface means commands and outputs, said DTMF originating and dial tone detecting means commands and outputs and said transmission test means commands and output being different and in non-overlapping relationship in their respective register means.

* * * * *